(12) United States Patent
Konno (10) Patent No.: US 8,262,235 B2
(45) Date of Patent: Sep. 11, 2012

(54) LASER PROJECTOR AND IMAGE PROJECTION METHOD FOR PROJECTING AN IMAGE WITH REDUCED SPECKLES ON THE PROJECTED LASER LIGHT IMAGE

(75) Inventor: Kenji Konno, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 346 days.

(21) Appl. No.: 12/671,778

(22) PCT Filed: Jul. 22, 2008

(86) PCT No.: PCT/JP2008/063115
§ 371 (c)(1),
(2), (4) Date: Feb. 2, 2010

(87) PCT Pub. No.: WO2009/019973
PCT Pub. Date: Feb. 12, 2009

(65) Prior Publication Data
US 2011/0235003 A1    Sep. 29, 2011

(30) Foreign Application Priority Data

Aug. 9, 2007  (JP) .................................. 2007-207675

(51) Int. Cl.
G03B 21/14   (2006.01)
G03B 21/22   (2006.01)
H01S 3/10    (2006.01)
G02B 26/10   (2006.01)
G02B 26/08   (2006.01)
G02B 27/64   (2006.01)
G09G 5/00    (2006.01)
G09G 3/34    (2006.01)

(52) U.S. Cl. .............. 353/119; 353/69; 372/24; 372/28; 359/219.2; 359/556; 359/201.1; 359/202.1; 359/298; 345/3.2; 345/84

(58) Field of Classification Search ................. 353/119, 353/69; 372/24, 26, 28; 359/219.2, 556, 359/201.1, 202.1, 298; 345/84, 3.2
See application file for complete search history.

(56) References Cited

U.S. PATENT DOCUMENTS
2005/0140925 A1   6/2005   Yavid et al. .................... 353/20
(Continued)

FOREIGN PATENT DOCUMENTS
CN         1506712 A     6/2004
(Continued)

OTHER PUBLICATIONS
Extended European Search Report dated Aug. 31, 2010, for counterpart European Application No. 08791396.8.
(Continued)

Primary Examiner — Georgia Y Epps
Assistant Examiner — Magda Cruz
(74) Attorney, Agent, or Firm — Cozen O'Connor (57) ABSTRACT

A laser projector comprises an oscillation device for displacing at least one of a plurality of optical elements, which constitute the projection optical system of the laser projector, periodically along the direction of the optical axis of laser light. The laser projector reduces the speckle of a projection image on an arbitrary screen to such an extent as it cannot be recognized with human eyes, without having a significant effect on the image resolution, by periodically displacing the position of the smallest spot of laser light projected from the projection optical system. An image projection method is also provided.

14 Claims, 4 Drawing Sheets

U.S. PATENT DOCUMENTS

| | | | |
|---|---|---|---|
| 2005/0141573 A1 | 6/2005 | Yavid et al. | 372/26 |
| 2006/0023164 A1 | 2/2006 | Sakaguchi et al. | 353/20 |
| 2009/0079945 A1* | 3/2009 | Klosowiak et al. | 353/69 |

FOREIGN PATENT DOCUMENTS

| | | |
|---|---|---|
| JP | 55-65940 | 3/1985 |
| JP | 60-52822 A | 3/1985 |
| JP | 2003-21806 | 1/2003 |
| JP | 2005-128563 A | 5/2005 |
| JP | 2006-267377 A | 1/2006 |
| JP | 2006-47422 A | 2/2006 |
| JP | 2006-284749 A | 10/2006 |
| JP | 2006-343464 A | 12/2006 |
| JP | 2006-343663 A | 12/2006 |
| JP | 2007-521519 A | 8/2007 |
| WO | WO 2006/050263 A2 | 5/2006 |
| WO | WO 2009/019973 A1 | 2/2009 |

OTHER PUBLICATIONS

People's Republic of China First Office Action dated Apr. 20, 2011, for counterpart Chinese Patent Application No. 200880101897.X, together with an English translation thereof.

* cited by examiner

LASER PROJECTOR AND IMAGE PROJECTION METHOD FOR PROJECTING AN IMAGE WITH REDUCED SPECKLES ON THE PROJECTED LASER LIGHT IMAGE

RELATED APPLICATIONS

This is a U.S. National Phase Application under 35 U.S.C. 371 of International Application PCT/JP2008/063115, filed on Jul. 22, 2008. This application claims the priority of Japanese application No. 2007-207675, filed Aug. 9, 2007, the entire content of which is hereby incorporated by reference.

TECHNICAL FIELD

The present invention is applicable to an image projector such as a pocket projector, a data projector, or a rear projection TV set, and relates to a laser projector and an image projection method to project an image on a screen using laser light and more particularly to a method to reduce speckles on a projected image generated by laser light.

BACKGROUND

Over recent years, various types of projectors employing laser light sources have been proposed and gathered much attention as next-generation high quality visual display devices from the viewpoint of ensuring a color reproduction range wider than that of conventional projectors employing discharge lamps as light sources.

When laser light is projected on a transmission-type screen or a reflection-type screen, due to interference of the laser light, a projected image looks floating above the screen or speckles appear on the screen as mottle noises. These speckles are desirably as small as possible since the observer's eyes are dazzled thereby, resulting in a problem in visual confirmation of the projected image and in a decrease in visual quality.

In Patent Document 1 listed below, in a scanning-type laser projector, a birefringence plate is arranged between a scanning member and a screen and the optical axis of the birefringence plate is positioned to be declined with respect to the polarization direction of laser light. Speckle patterns produced by two polarization-separated laser lights are superimposed to reduce speckle contrast.

In Patent Document 2 listed below, in a rear projection-type display employing a laser light source, a screen is rotated parallel to the image plane to reduce speckles or scintillation.

In Patent Document 3 listed below, in a rear projection-type display, a projection lens is minutely vibrated in the direction perpendicular to the optical axis to reduce speckles or scintillation.

Patent Document 1: Unexamined Japanese Patent Application Publication No. 2006-284749
Patent Document 2: Unexamined Japanese Patent Application Publication No. 2006-343663
Patent Document 3: Unexamined Japanese Patent Application Publication No. 2003-21806

DISCLOSURE OF THE INVENTION

Problems to be Solved by the Invention

Patent Document 1 is intended to reduce speckles by superimposing polarized light. However, such polarized light exists only in two perpendicular directions, and the reduction effect attained with superimposition is only 50%.

Patent Document 2 is considered to produce a speckle reduction effect to some extent. However, since a large screen needs to be moved, a larger-size driving constitution is inevitably required. Further, usable screens are limited. Therefore, it is not suitable to potable projectors used for unspecified screens, for example.

In Patent Document 3, a projection lens is minutely vibrated in the direction perpendicular to the optical axis. Thereby, the pixel size substantially becomes large in the vibration direction, resulting in degraded resolution.

In view of the above circumstances, the present invention was conceived. An object of the present invention is to provide a laser projector and an image projection method to reduce speckles on a projected image on an arbitrary screen with no significant effect on image resolution.

Means for Solving the Problems

An object of the present invention is attained by the following configurations.

Item 1. A laser projector, comprising:
a laser light source;
a projection optical system including a plurality of optical elements to project a laser light from the laser light source to a screen; and
a vibration device for cyclically displacing at least one optical element of the plurality of optical elements along an optical axis direction of the laser light.

Item 2. The laser projector of item 1, wherein the projection optical system includes:
a scanning device for two-dimensionally scanning the laser light; and
an incident optical system for transmitting the laser light from the laser light source to the scanning device.

Item 3. The laser projector of item 1, wherein the projection optical system includes:
a scanning device for two-dimensionally scanning the laser light;
an incident optical system for transferring the laser light from the laser light source to the scanning device; and
a scanning optical system for transferring the laser light scanned by the scanning device to the screen.

Item 4. The laser projector of item 2 or 3, wherein the vibration device is mounted on at least one of a plurality of optical elements constituting the incident optical system.

Item 5. The laser projector of item 3, wherein the vibration device is mounted on at least one of a plurality of optical elements constituting the scanning optical system.

Item 6. The laser projector of claim 2 or 3, wherein the vibration device is mounted on the scanning device.

Item 7. The laser projector of any one of items 1 to 3, comprising:
a base on which the projection optical system is wholly mounted,
wherein the vibration device is mounted on the base.

Item 8. The laser projector of any one of items 1 to 7, wherein the following relationship is satisfied:

$$F\text{scan}/F\text{def} \neq N$$

where:
$F\text{scan}$ Hz is a frame frequency of an image;
$F\text{def}$ Hz is a vibration frequency of the vibration device; and
N is an integer equal to or greater than 1.

Item 9. The laser projector of any one of items 1 to 7, wherein the following relationship is satisfied:

$$W < \Delta < \pi \cdot W^2/(2\lambda)$$

where:

Δ is an amount of positional displacement, in the optical axis direction, of a minimum spot of the laser light projected from the projection optical system, which positional displacement is caused by the cyclic displacement of the optical element;

W is a spot size of the laser light at the minimum spot position;

λ is a wave length of the laser light; and

π is the circular constant.

Item 10. A method for projecting an image, mounting the laser projector of any one of items 1 to 9; and projecting an image onto a substantially planar surface which includes a substantially vertical direction and is vertically arranged ahead in a projection direction of the laser projector.

Effects of the Invention

According to the present invention, a vibration device is provided to periodically displace at least one optical element of a plurality of optical elements constituting the projection optical system of a laser projector in the optical axis direction of laser light, and the minimum spot position of laser light projected from the projection optical system is periodically displaced in the optical axis direction of the laser light, whereby there can be provided a laser projector and an image projection method to reduce speckles on a projected image on an arbitrary screen to the extent that the speckles cannot be recognized by the human eye with no significant effect on image resolution.

Accordingly, the present invention is extremely industrially useful from the viewpoint of reducing speckles on a projected image on a screen.

DESCRIPTION OF THE SYMBOLS

LB, LR, and LG: Laser elements
L1, L2, L3, L4, L5, and L6: Lenses
M1, M2, and M3: Color combination combining mirrors
MS: Scanning device
SC: Screen
UA and UB: Lens units
BP: Base
VB: Vibration device

DESCRIPTION OF THE PREFERRED EMBODIMENTS

A laser projector according to the present invention is constituted by a laser light source and a plurality of optical elements, a projection optical system to project laser light from the laser light source onto a screen, and a vibration device to periodically displace at least one optical element of a plurality of the optical elements in the optical axis direction of the laser light.

More specifically, the projection optical system is provided with a scanning device to scan the laser light two-dimensionally, an incident optical system to transfer the laser light from the laser light source to the scanning device, and a scanning optical system to transmit the laser light scanned by the scanning device to a screen.

In the case in which a light source such as a laser light source generating coherent light is used, when speckles are generated as described above, a projected image looks as if it is floating, thereby deteriorating the visual quality. Since such speckles are unavoidable as long as coherent light is used, the generation thereof cannot be completely inhibited. Therefore, methods to reduce as many speckles as possible are being desired.

Methods to reduce speckles are roughly categorized into two methods. The first method is one reducing apparent coherency of a light source, to be specific, it is a method in which the light source side is added some ingenuity such as follows: a) a plurality of polarization states are superimposed; b) a plurality of wavelengths are superimposed; or c) a plurality of phase states are superimposed. However, any of these methods is not very preferable since the uniformity of polarization and the unity of wavelength characteristic of a laser light source are impaired.

The second method is one reducing speckles by temporally changing speckles to an insensible extent to a human eye and superposing them. Speckles can be reduced only by temporal integration in such a manner that it is not recognized by a human eye, whereby the uniformity of polarization and wavelength of the laser light source can be maintained.

In a laser projector according to the present invention, at least one optical element of a plurality of optical elements constituting a projection optical system is periodically displaced in the optical axis direction of laser light, whereby the minimum spot position of the projected laser light is periodically displaced in the optical axis direction of the laser light to reduce speckles.

A projection optical system is commonly configured to allow laser light projected from a laser projector to make the minimum spot on the screen surface. Therefore, in the following description and each embodiment, description is made not on the displacement amount of the minimum spot position of laser light in the optical axis direction, but on the defocus (blur) amount of laser light on the screen.

In order to generate periodical defocusing, there are considered following methods: 1) the entire projection optical system is periodically displaced in the optical axis direction; 2) a scanning device such as an MEMS (Micro Electro Mechanical System) mirror is periodically displaced; 3) at least a part of an incident optical system is periodically displaced in the optical axis direction; and 4) at least a part of a scanning optical system is periodically displaced in the optical axis direction. Any of the above methods equally produces a speckle reduction effect.

Further, when the method for reducing speckles by defocusing is practiced, a laser projector of a scanning-type laser system is preferably used. Because the scanning-type laser system is characterized in that the laser light is focused on every position on the screen. Therefore, adverse effects of image deterioration due to defocusing are less noticeable than, for example, that when a two-dimensional liquid crystal panel or a DMD (Digital Micromirror Device) is used.

Still further, in such a scanning-type laser system, light reaches one pixel of a projected image only once per frame. For example, when the frame period of an image is 1/60 second, light is applied to one pixel every 1/60 second. Therefore, the speckle state in one pixel varies every frame period, resulting in an advantage that speckles is principally less noticeable, different from a pixel projection type (e.g., a DMD, a liquid crystal panel, and a hologram system).

In addition, when the defocusing is periodically caused, although speckles are temporarily generated, they are recognized in accumulation by human eyes, thereby reducing speckles.

In that case, when the vibration frequency of defocusing is synchronized with a frame rate, averaging is difficult to be carried out. As a countermeasure thereto, it is preferable that the frame frequency of an image is not the integer multiple of the vibration frequency of defocusing. Namely, when the frame frequency of an image is Hz, the vibration frequency of a vibration device is Fdef Hz, and N is assumed as an integer no less than 1, the following relationship is preferably satisfied:

$$F\text{scan}/F\text{def} \neq N.$$

Further, when the frame frequency of an image is in the vicinity of the integer multiple of the vibration frequency of defocusing, speckle averaging may not be carried out sufficiently. Therefore, using function Frac ( ) to determine the decimal part of a real number, the relationship of $$0.05 < F\text{rac}(F\text{scan}/F\text{def}) < 0.95$$

is more preferably satisfied.

For example, when frame frequency Fscan of an image and vibration frequency Fdef of defocusing are set to be 60 (Hz) and 30 (Hz), respectively, the same defocus state is generated once in twice in screen rewriting, resulting in generation of the same speckles once in twice. In this case, the same speckles are generated at every 30 Hz, whereby averaging is disturbed, resulting in making a speckle reduction effect half the maximum. In the same manner, when Fdef is set at 20 Hz or 10 Hz, which is a fraction of N (or N-fold) of 60 Hz, a speckle reduction effect is also decreased.

The above relationship is defined so that Fscan and Fdef are not a dividable state, and when the relationship is satisfied, specific repetition of the same speckles is avoided. For example, when the frame frequency is 60 Hz, and the vibration frequency is assumed as 13 Hz, function Frac (60/13) ≈0.615. In this case, the same speckles appear once in 780 frames. Therefore, even when the same pattern is generated every 13 seconds, an adequate speckle reduction effect is obtained.

Next, with regard to the vibration amplitude for defocusing, when the amount of defocus on a screen caused by periodical displacement of an optical element is assumed to be $\Delta$; the spot size of laser light on the screen is assumed to be W; the wavelength of the laser light is assumed to be $\lambda$; and the circular constant is assumed to be $\pi$, the following relationship is preferably satisfied:

$$W < \Delta < \pi \cdot W^2/(2\lambda).$$

The lower limit of this conditional expression means that unless defocus amount $\Delta$ is changed to the extent that defocus amount corresponds to the spot size on the screen, a speckle pattern is not effectively changed, and the averaging is not effectively performed.

The upper limit of the conditional expression is half of the so called Rayleigh length ($\pi \cdot W^2/\lambda$). The Rayleigh length is defined as the defocus amount that causes the defocus making the spot size to be 1.4 times (square-root-2 times). When the spot size is more than 1.4 times, the resolution of a projected image decreases down to at most 1/1.4. This is equivalent to the fact that when a black and white is alternately projected on every pixel, the contrast decreases by half due to defocusing, which contrast is unacceptable as visual quality. Setting the defocus amount $\Delta$ at less than half of the Rayleigh length is equivalent to an only about 10% increase in spot size, and with such an extent, large resolution degradation is not induced, resulting in excellent speckle reduction.

The specific constitution according to the present invention will now be described.

First Embodiment

Figure 1:
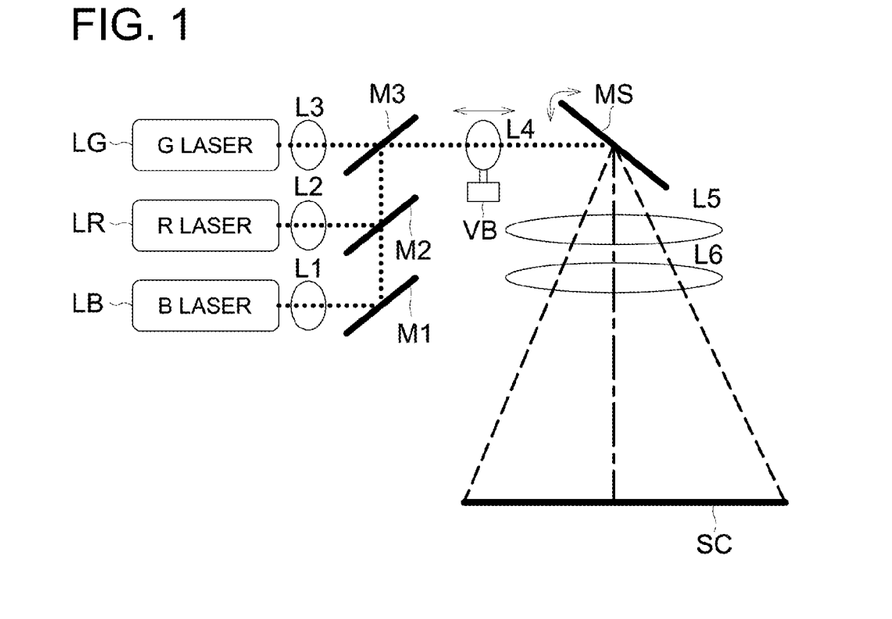
FIG. 1 is a constitutional view showing a first embodiment of the present invention.

FIG. 1 is a constitutional view showing a first embodiment of the present invention. This laser projector is constituted of a laser light source unit and a projection optical system to project laser light from the laser light source unit onto a fixed screen SC.

The laser light source unit is provided with laser element LB emitting B (blue) light, laser element LR emitting R (red) light, and laser element LG emitting G (green) light. Laser element LB is constituted of a semiconductor laser, for example, emitting light with a wavelength of 445 nm. Laser element LR is constituted of a semiconductor laser, for example, emitting light with a wavelength of 630 nm. Laser element LG is constituted of a semiconductor excitation solid laser, for example, emitting light with a wavelength of 532 nm employing second harmonic generation.

In laser elements LR and LB, an injection current into a laser chip may directly be modulated or an optical modulator such as an AO (acousto-optical) element may be separately provided. In laser element LG, injection current into an excitation laser chip may directly be modulated or an optical modulator such as an AO element may be separately provided.

The projection optical system is constituted of an incident optical system, scanning device MS, and a scanning optical system.

The incident optical system functions to transmit laser light from the laser light source unit to scanning device MS. For example, in FIG. 1, the incident optical system is constituted of lenses L1, L2, and L3 to independently converge laser light from each of laser elements LB, LR, and LG; color combining mirrors M1, M2, and M3 to coaxially combine each laser light from lenses L1, L2, and L3; and lens L4 to converge the thus-composed laser light.

Scanning device MS functions to scan the laser light two-dimensionally. Scanning device MS may have a constitution in which a main scanning mirror and a sub-scanning mirror are provided separately or a single mirror is provided with a main scanning drive mechanism and a sub-scanning drive mechanism. For example, scanning device MS may incorporate an MEMS mirror mechanism provided with scanning mirrors which are vibrated horizontally and vertically by a piezoelectric element.

The scanning optical system functions to transmit laser light scanned by scanning device MS to the screen. For example, in FIG. 1, the scanning optical system is provided with two lenses L5 and L6. Lenses L5 and L6 may also be replaced with a curved mirror optical system.

With this arrangement, the laser light from each of laser elements LB, LR, and LG is intensity-modulated based on image signals fed from the outside, and also scanning device MS carries out vertical scanning at a predetermined frame frequency and horizontal scanning at a predetermined horizontal scanning frequency, whereby a two-dimensional image is projected onto screen SC.

When screen SC is of transmission type, a rear projection-type display can be structured. In contrast, when screen SC is of reflection type, a front projection-type display can be structured.

In the present embodiment, vibration device VB is provided on lens L4 out of the plurality of optical elements constituting the incident optical system. Namely, a base on which the entire projection optical system is mounted is stationary with respect to screen SC, and vibration device VB intermediates between this base and lens L4.

Vibration device VB functions to periodically displace lens L4 in the optical axis direction of laser light, whereby periodical defocusing (blur) is generated on screen SC.

For example, frame frequency Fscan of an image on screen SC is set to be 60 Hz; vibration frequency Fdef of vibration device VB is set to be 13 Hz; spot size W on screen SC is set to be 50 μm; and wavelength λ of laser light is set to be 532 nm, and whereby the displacement amount of lens L4 is set so that defocus amount Δ on screen SC is 3 mm.

As described above, according to the first embodiment, when lens L4 out of the plurality of optical elements constituting the incident optical system is provided with vibration device VB, periodical defocusing (blur) is generated on screen SC, whereby there is provided a laser projector and an image projection method to reduce speckles on a projected image on an arbitrary screen to the extent that the speckles cannot be recognized by a human eye with no significant effect on image resolution.

Second Embodiment

Figure 2:
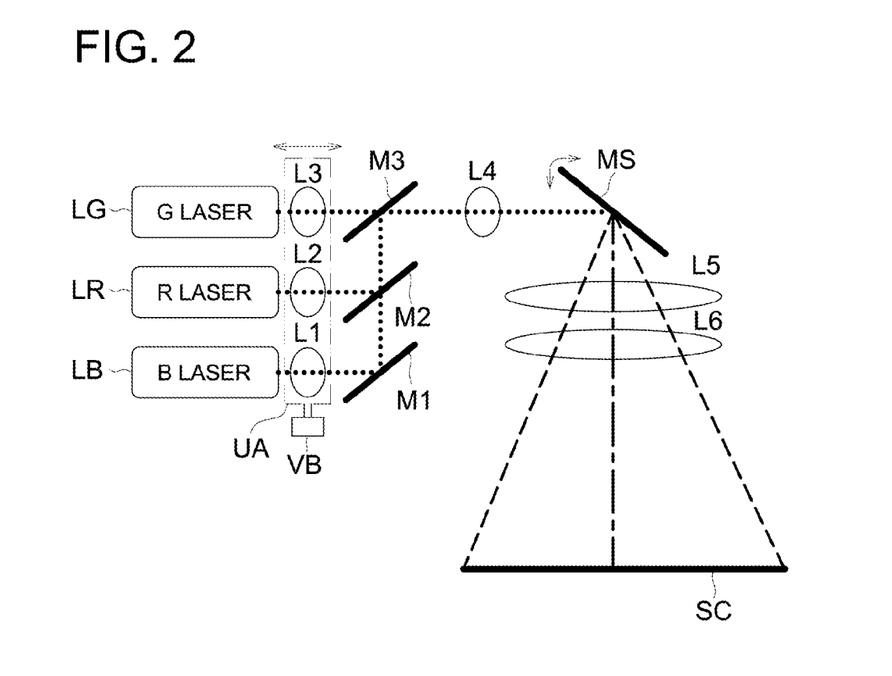
FIG. 2 is a constitutional view showing a second embodiment of the present invention.

FIG. 2 is a constitutional view showing a second embodiment of the present invention. This laser projector has a constitution similar to that in FIG. 1. In the present embodiment, lens unit UA, in which lenses L1, L2, and L3 out of the plurality of optical elements constituting the incident optical system are integrally mounted, is provided with vibration device VB. Namely, a base on which the entire projection optical system is mounted is stationary with respect to screen SC, and vibration device VB intermediates between this base and lens unit UA.

Vibration device VB functions to periodically displace lenses L1, L2, and L3 in the optical axis direction of the laser light, whereby periodical defocusing (blur) can be generated on screen SC.

For example, frame frequency Fscan of an image on screen SC is set to be 60 Hz; vibration frequency Fdef of vibration device VB is set to be 24 Hz; spot size W on screen SC is set to be 500 μm; and wavelength λ of laser light is set to be 665 nm, and whereby the displacement amounts of lenses L1, L2, and L3 are set so that defocus amount Δ on screen SC is set to be 100 mm.

As described above, according to the second embodiment, when lens unit UA, in which lenses L1, L2, and L3 out of the plurality of optical elements constituting the incident optical system are integrally mounted, is provided with vibration device VB, periodical defocusing (blur) is generated on screen SC, whereby there is provided a laser projector and an image projection method to reduce speckles on a projected image on an arbitrary screen to the extent that the speckles cannot be recognized by a human eye with no significant effect on image resolution.

Third Embodiment

Figure 3:
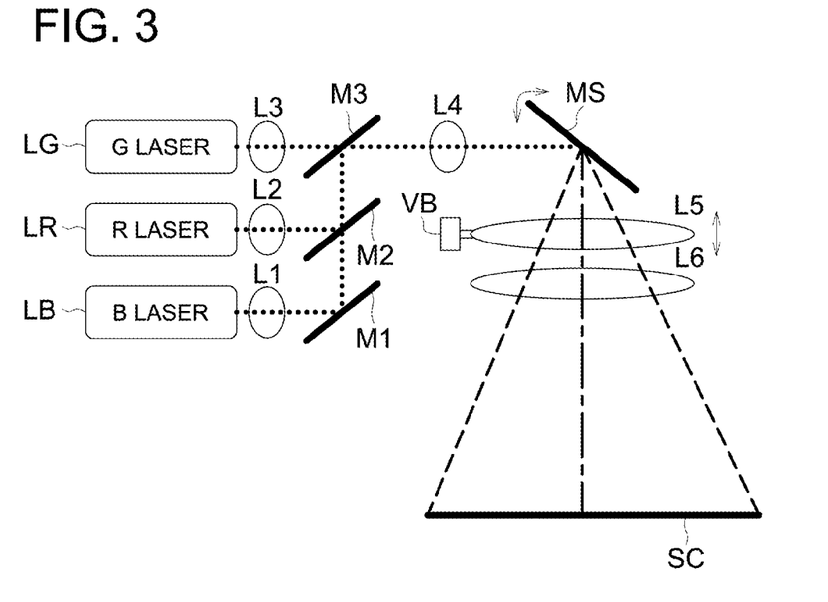
FIG. 3 is a constitutional view showing a third embodiment of the present invention.

FIG. 3 is a constitutional view showing a third embodiment of the present invention. This laser projector has a constitution similar to that in FIG. 1. In the present embodiment, lens L5 out of the plurality of optical elements constituting the scanning optical system is provided with vibration device VB. Namely, a base on which the entire projection optical system is mounted is stationary with respect to screen SC, and vibration device VB intermediates between this base and lens L5.

Vibration device VB functions to periodically displace lens L5 in the optical axis direction of laser light, whereby periodical defocusing (blur) is generated on screen SC.

For example, frame frequency Fscan of an image on screen SC is set to be 30 Hz; vibration frequency Fdef of vibration device VB is set to be 7 Hz; spot size W on screen SC is set to be 40 μm; and wavelength λ of laser light is set to be 532 nm, and whereby the displacement amount of lens L5 is set so that defocus amount Δ on screen SC is set to be 30 mm.

As described above, according to the third embodiment, when lens L5 out of the plurality of optical elements constituting the incident optical system is provided with vibration device VB, periodical defocusing (blur) is generated on screen SC, whereby there is provided a laser projector and an image projection method to reduce speckles on a projected image on an arbitrary screen to the extent that the speckles cannot be recognized by a human eye with no significant effect on image resolution.

Fourth Embodiment

Figure 4:
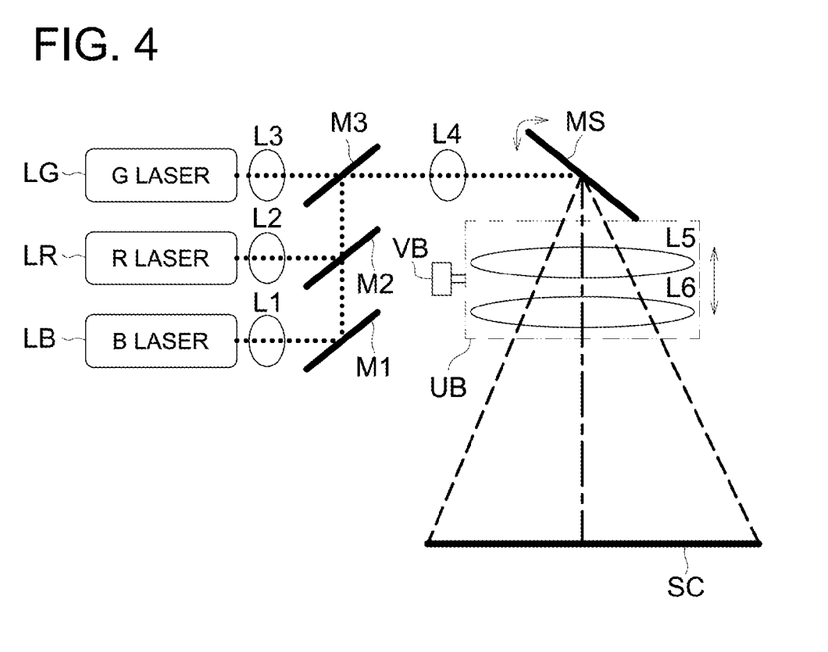
FIG. 4 is a constitutional view showing a fourth embodiment of the present invention.

FIG. 4 is a constitutional view showing a fourth embodiment of the present invention. This laser projector has a constitution similar to that in FIG. 1. In the present embodiment, lens unit UB, in which lenses L5 and L6 out of the plurality of optical elements constituting the scanning optical system are integrally mounted, is provided with vibration device VB. Namely, a base on which the entire projection optical system is mounted is stationary with respect to screen SC, and vibration device VB intermediates between this base and lens unit UB.

Vibration device VB functions to periodically displace lenses L5 and L6 in the optical axis direction of the laser light, whereby periodical defocusing (blur) is generated on screen SC.

For example, frame frequency Fscan of an image on screen SC is set to be 30 Hz; vibration frequency Fdef of vibration device VB is set to be 8 Hz; spot size W on screen SC is set to be 800 μm; and wavelength λ of laser light is set to be 532 nm, and whereby the displacement amounts of lenses L5 and L6 are set so that defocus amount Δ on screen SC is set to be 1 mm.

As described above, according to the fourth embodiment, when lens unit UB, in which lenses L5 and L6 out of the plurality of optical elements constituting the scanning optical system are integrally mounted, is provided with vibration device VB, periodical defocusing (blur) is generated on screen SC, whereby there is provided a laser projector and an image projection method to reduce speckles on a projected image on an arbitrary screen to the extent that the speckles cannot be recognized by a human eye with no significant effect on image resolution.

Fifth Embodiment

Figure 5:
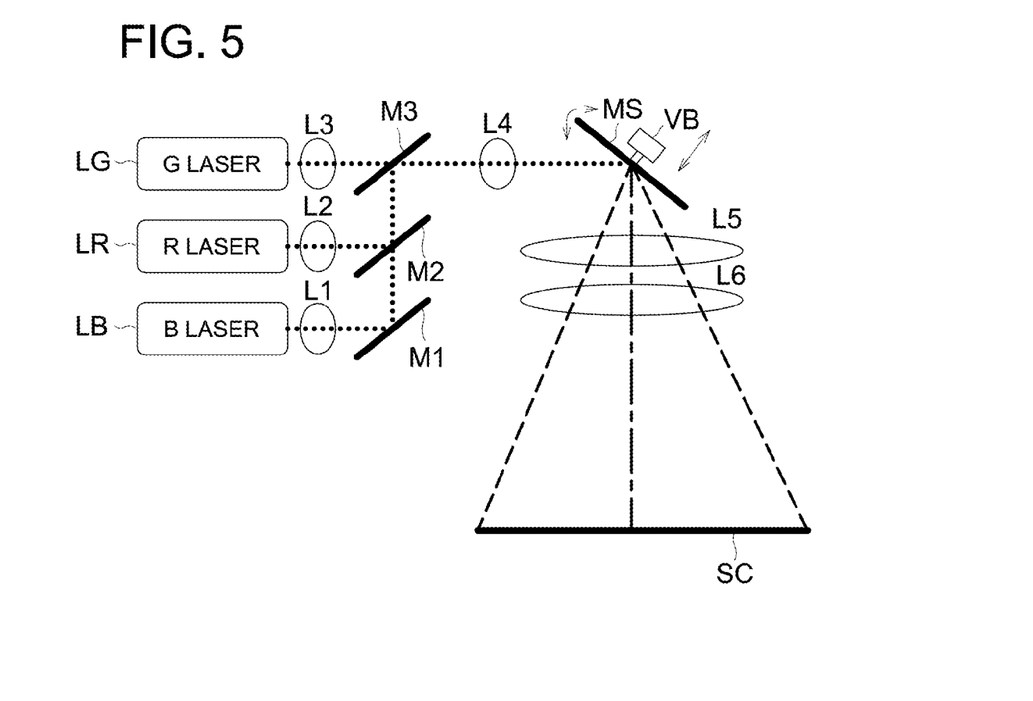
FIG. 5 is a constitutional view showing a fifth embodiment of the present invention.

FIG. 5 is a constitutional view showing a fifth embodiment of the present invention. This laser projector has a constitution similar to that in FIG. 1. In the present embodiment, scanning device MS is provided with vibration device VB. Namely, a base on which the entire projection optical system is mounted is stationary with respect to screen SC, and vibration device VB intermediates between this base and scanning device MS.

Vibration device VB functions to vibrate a scanning mirror mounted on scanning device MS in a predetermined direction and thereby periodically displacing the laser light reflected by the scanning mirror in the optical axis direction thereof, whereby periodical defocusing (blur) is generated on screen SC.

For example, frame frequency Fscan of an image on screen SC is set to be 60 Hz; vibration frequency Fdef of vibration device VB is set to be 44 Hz; spot size W on screen SC is set to be 200 μm; and wavelength λ of laser light is set to be 445 nm, and whereby the displacement amount of scanning device MS is set so that defocus amount Δ on screen SC is set to be 0.3 mm.

As described above, according to the fifth embodiment, when scanning device MS is provided with vibration device VB, periodical defocusing (blur) is generated on screen SC, whereby there can be provided a laser projector and an image projection method to reduce speckles on a projected image on an arbitrary screen to the extent that the speckles cannot be recognized by a human eye with no significant effect on image resolution.

Sixth Embodiment

Figure 6:
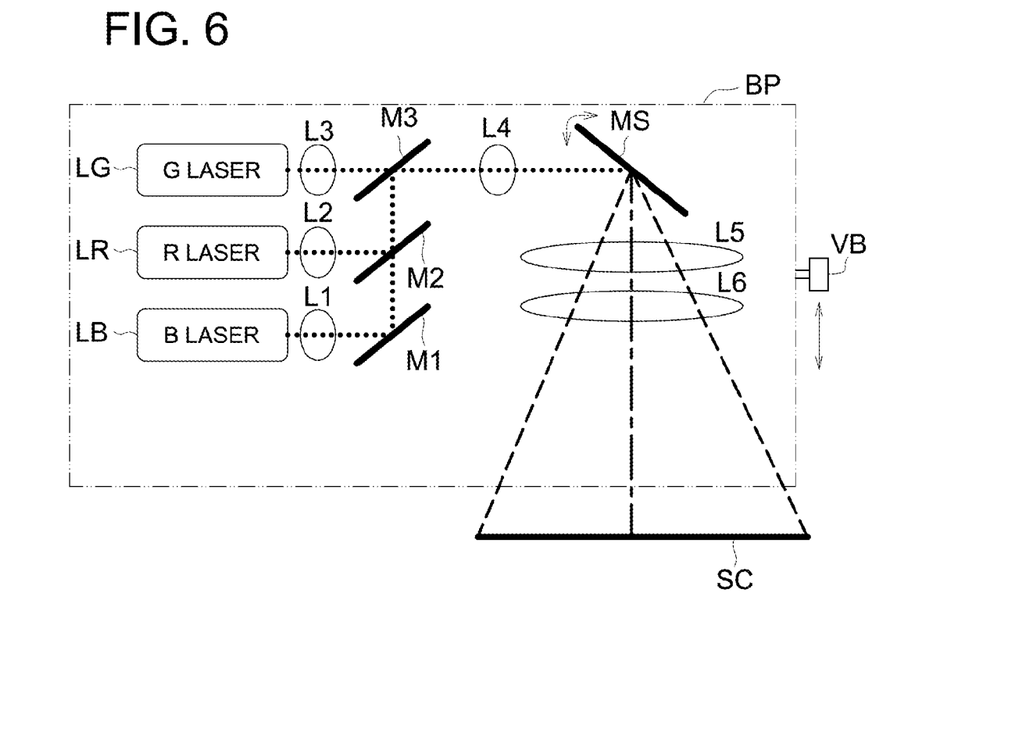
FIG. 6 is a constitutional view showing a sixth embodiment of the present invention.

FIG. 6 is a constitutional view showing a sixth embodiment of the present invention. This laser projector has a constitution similar to that in FIG. 1. In the present embodiment, base BP on which the entire projection optical system is mounted is provided with vibration device VB. Namely, the chassis of the laser projector is stationary with respect to screen SC, and vibration device VB intermediates between this chassis and base BP.

Vibration device VB functions to periodically displace base BP in the optical axis direction of the laser light projected toward screen SC, whereby periodical defocusing (blur) is generated on screen SC.

For example, frame frequency Fscan of an image on screen SC is set to be 120 Hz; vibration frequency Fdef of vibration device VB is set to be 99 Hz; spot size W on screen SC is set to be 30 μm; and wavelength λ of laser light is set to be 445 nm, and whereby the displacement amount of base BP is set so that defocus amount Δ on screen SC is set to be 0.8 mm.

As described above, according to the sixth embodiment, when base BP on which the entire projection optical system is mounted is provided with vibration device VB, periodical defocusing (blur) is generated on screen SC, whereby there can be provided a laser projector and an image projection method to reduce speckles on a projected image on an arbitrary screen to the extent that the speckles cannot be recognized by a human eye with no significant effect on image resolution.

Seventh Embodiment

Figure 7:
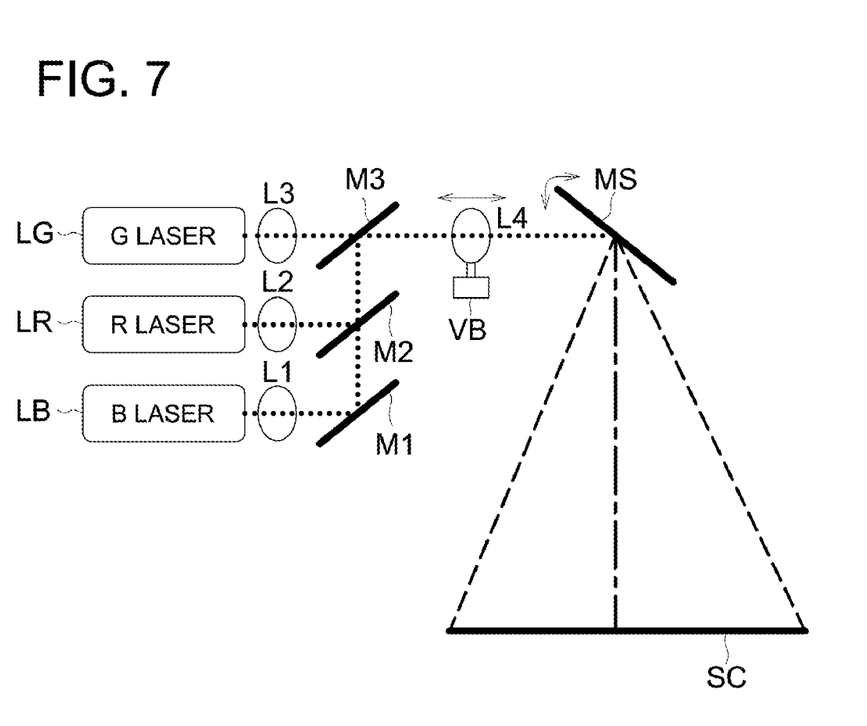
FIG. 7 is a constitutional view showing a seventh embodiment of the present invention.

FIG. 7 is a constitutional view showing a seventh embodiment of the present invention. This laser projector has a constitution similar to that in FIG. 1. To simplify the constitution, the scanning optical system containing lenses L5 and L6 is omitted, and laser light scanned by scanning device MS is projected directly onto screen SC. In this case, the scanning angle of scanning device MS is set to be relatively small, whereby a useful projector can be realized.

In the present embodiment, in the same manner as in FIG. 1, lens L4 out of a plurality of optical elements constituting the incident optical system is provided with vibration device VB. Namely, a base on which the entire projection optical system is mounted is stationary with respect to screen SC, and vibration device VB intermediates between this base and lens L4.

Vibration device VB functions to periodically displace lens L4 in the optical axis direction of the laser light, whereby periodical defocusing (blur) is generated on screen SC.

For example, frame frequency Fscan of an image on screen SC is set to be 60 Hz; vibration frequency Fdef of vibration device VB is set to be 13 Hz; spot size W on screen SC is set to be 50 μm; and wavelength λ of laser light is set to be 532 nm, and whereby the displacement amount of lens L4 is set so that defocus amount Δ on screen SC is set to be 3 mm.

As described above, according to the seventh embodiment, when lens L4 out of a plurality of optical elements constituting the incident optical system is provided with vibration device VB, periodical defocusing (blur) is generated on screen SC, whereby there is provided a laser projector and an image projection method to reduce speckles on a projected image on an arbitrary screen to the extent that the speckles cannot be recognized by a human eye with no significant effect on image resolution. Further, the omission of the scanning optical system containing lenses L5 and L6 makes it possible to simplify the constitution of the laser projector and thereby to contribute to realization of a smaller-size device.

For easy understanding, defocusing conditions for speckle reduction in each of the above embodiments are organized and listed below (Table 1).

TABLE 1

|  | Fscan (Hz) | Fdef (Hz) | Fscan/Fdef | Frac (Fscan/Fdef) | λ (nm) | W (μm) | $\pi \cdot W^2 (2\lambda)$ (mm) | Δ (mm) |
|---|---|---|---|---|---|---|---|---|
| First Embodiment | 60 | 13 | 4.6154 | 0.615 | 532 | 50 | 7.38 | 3 |
| Second Embodiment | 60 | 24 | 2.5000 | 0.500 | 665 | 500 | 590.52 | 100 |
| Third Embodiment | 30 | 7 | 4.2857 | 0.286 | 532 | 40 | 4.72 | 30 |
| Fourth Embodiment | 30 | 8 | 3.7500 | 0.750 | 532 | 800 | 1889.68 | 1 |
| Fifth Embodiment | 60 | 44 | 1.3636 | 0.634 | 445 | 200 | 141.20 | 0.3 |
| Sixth Embodiment | 120 | 99 | 1.2121 | 0.212 | 445 | 30 | 3.18 | 0.8 |
| Seventh Embodiment | 60 | 13 | 4.6154 | 0.615 | 532 | 50 | 7.38 | 3 |

It should be noted that various components can be displaced in the optical axis direction in the first to seventh embodiment. In view of the load of vibration device VB, a small component is favorable to bed displaced. Further, from the viewpoint of the mechanical constitution of vibration device VB, a component having a structure in which the component can be easily separated from other optical system is favorable. Therefore, for example, as in the first and seventh embodiment, lens L4 is favorable to be displaced since this lens is small and a large distance apart from adjacent elements.

Further, the speckle reduction method of the present invention does not depend on screen material or surface accuracy. Therefore, an image can be observed when the laser light is projected on a flat surface in the following situations as long as the surface has a certain area. The laser projector of the present invention is placed, for example, on a platform such as a table in a conference room, and then the laser light is projected on a simple screen disposed in a conference room. Alternatively, the laser light is projected on a wall or a whiteboard in a conference room which is not usually used as a screen. When this flat surface is nearly perpendicular to the floor of the conference room and also contains the nearly vertical direction, a projected image can be easily observed. As described above, the speckle reduction method of the present invention does not depend on screen, whereby even when an image is projected onto a commercially available simple screen, a wall of a room instead of such a screen, or a whiteboard, a high-quality image with reduced speckles is projected.

As described above, according to the present invention, a vibration device to periodically displace at least one optical element of a plurality of optical elements constituting the projection optical system of a laser projector in the optical axis direction of laser light is provided and then the minimum spot position of the laser light projected from the projection optical system is periodically displaced in the optical axis direction of the laser light, whereby there can be provided a laser projector and an image projection method to reduce speckles on a projected image on an arbitrary screen to the extent that the speckles cannot be recognized by a human eye with no significant effect on image resolution.

Any detailed constitution and movement of the structural components constituting a laser projector and an image projection method according to the present invention can be appropriately changed and modified without departing from the spirit of the present invention.

The invention claimed is:

1. A laser projector, comprising:
a laser light source;
a projection optical system including a plurality of optical elements to converge and project a laser light from the laser light source to a screen; and
a vibration device for cyclically displacing at least one optical element of the plurality of optical elements along an optical axis direction of the laser light so that a position of a minimum spot of the converged laser light displaces in the optical axis direction of the laser light at the screen,
wherein the following relationship is satisfied:

$$W < \Delta < \pi W^2/(2\lambda)$$

where:
$\Delta$ is an amount of displacement of the position of the minimum spot, which displacement is caused by the cyclic displacement of the optical element;
W is a spot size of the minimum spot of the laser light;
$\lambda$ is a wave length of the laser light; and
$\pi$ is the circular constant.

2. The laser projector of claim 1, wherein the projection optical system includes:
a scanning device for two-dimensionally scanning the laser light; and
an incident optical system for transmitting the laser light from the laser light source to the scanning device.

3. The laser projector of claim 2, wherein the incident optical system is constituted by a plurality of optical elements, and the vibration device is mounted on at least one of the plurality of optical elements constituting the incident optical system.

4. The laser projector of claim 2, wherein the vibration device is mounted on the scanning device.

5. The laser projector of claim 2, further comprising:
a base on which the laser light source and the projection optical system are wholly mounted,
wherein the vibration device is mounted on the base.

6. The laser projector of claim 2, wherein the following relationship is satisfied:

$$F\text{scan}/F\text{def} \neq N$$

where:
Fscan Hz is a frame frequency of the two-dimensional scan of the laser light;
Fdef Hz is a vibration frequency of the vibration device; and
N is an integer equal to or greater than 1.

7. The laser projector of claim 1, wherein the projection optical system includes:
a scanning device for two-dimensionally scanning the laser light;
an incident optical system for transferring the laser light from the laser light source to the scanning device; and
a scanning optical system for transferring the laser light scanned by the scanning device to the screen.

8. The laser projector of claim 7, wherein the incident optical system is constituted by a plurality of optical elements, and the vibration device is mounted on at least one of the plurality of optical elements constituting the incident optical system.

9. The laser projector of claim 7, wherein the scanning optical system is constituted by a plurality of optical elements, and the vibration device is mounted on at least one of the plurality of optical elements constituting the scanning optical system.

10. The laser projector of claim 7, wherein the vibration device is mounted on the scanning device.

11. The laser projector of claim 7, further comprising:
a base on which the laser light source and the projection optical system are wholly mounted,
wherein the vibration device is mounted on the base.

12. A method for projecting an image, comprising the steps of:
mounting the laser projector of claim 1; and
projecting an image onto a substantially planar surface which includes a substantially vertical direction and is vertically arranged ahead in a projection direction of the laser projector.

13. The laser projector of claim 1, further comprising:
a base on which the laser light source and the projection optical system are wholly mounted,
wherein the vibration device is mounted on the base.

14. The laser projector of claim 1, further comprising:
a base on which the laser light source and the projection optical system are wholly mounted,
wherein the vibration device is connected to the base to cyclically displace the base so that the at least one of the plurality of optical elements is cyclically displaced.

* * * * *